United States Patent [19]
Solhjell

[11] Patent Number: 5,457,586
[45] Date of Patent: Oct. 10, 1995

[54] METHOD AND ARRANGEMENT FOR POSITIONING A MAGNETIC HEAD RELATIVE TO THE STORAGE MEDIUM OF A MAGNETIC LAYER STORAGE

[75] Inventor: Erik Solhjell, Oslo, Norway

[73] Assignee: Tandberg Data A/S, Oslo, Norway

[21] Appl. No.: 697,690

[22] Filed: May 9, 1991

[30] Foreign Application Priority Data

Aug. 14, 1990 [EP] European Pat. Off. ............ 90115593

[51] Int. Cl.⁶ .......................... G11B 5/596; G11B 21/02
[52] U.S. Cl. ................................. 360/77.04; 360/77.11; 360/75; 360/76
[58] Field of Search ....................... 360/77.11, 45, 360/77.04, 75, 76, 77.01

[56] References Cited

U.S. PATENT DOCUMENTS

| | | | |
|---|---|---|---|
| 4,157,576 | 6/1979 | Hack et al. | 360/77.11 |
| 4,244,008 | 1/1981 | Holt | 360/45 |
| 4,476,503 | 10/1984 | Solhjell | 360/75 |
| 4,639,796 | 1/1987 | Solhjell | 360/77 |
| 4,679,104 | 7/1987 | Dahlerud | 360/78 |

*Primary Examiner*—John S. Heyman
*Assistant Examiner*—Trong Phan
*Attorney, Agent, or Firm*—Hill, Steadman & Simpson

[57] ABSTRACT

In a magnetic layer storage having a magnetic head positionable relative to a storage medium, a reference storage medium produced with high precision is employed for the individual calibration of the storage tape drive, and particularly a positioner means thereof. This reference storage medium carries a track pattern adapted to the respective application and whose exact position is known. During the test run of each and every individual tape drive, this reference storage medium is read, and the read signals are evaluated in order to identify offset of actual position of the magnetic head from its absolute position defined by the reference storage medium. Individual correction factors can be acquired from the relationship of the absolute position to the actual position, these correction factors being stored in the control electronics and being employed during normal operation for correcting the tolerances of the positioner means or of the magnetic head itself.

6 Claims, 3 Drawing Sheets

METHOD AND ARRANGEMENT FOR POSITIONING A MAGNETIC HEAD RELATIVE TO THE STORAGE MEDIUM OF A MAGNETIC LAYER STORAGE

BACKGROUND OF THE INVENTION

The invention is directed to a method and to an arrangement for positioning a magnetic head to various tracks of a storage medium of a magnetic layer storage.

In magnetic recording and playback, it is standard both given magnetic disc storages as well as magnetic tape storages to employ a magnetic head system that can be set to various tracks of the disc-shaped or tape-shaped storage medium. A number of tracks on the recording medium can thus be accessed with a relatively simple magnetic write/read head. The write/read head in magnetic disc storages is frequently composed of a single head system that can be positioned to a respective one of the many information tracks of the allocated storage disc with the assistance of a linear or rotary positioner.

By contrast, a greater number of designs of the magnetic head systems are known for magnetic tape storages. These extend from a simple magnetic head having only one gap, up to complex magnetic head systems having a plurality of parallel recording channels, i.e. multi-track heads. Different operating modes, moreover, are standard in magnetic tape devices. Thus, it is notoriously known to again immediately read information just recorded in order to be able to immediately correct recording errors as warranted. In this case, a write head and a read head arranged immediately following it in a tape conveying direction are required since the functions "record" and "read" must simultaneously sequence. It is also known to execute the two functions of "writing" and/or "reading" as well in both conveying directions of the magnetic tape. Without this enumeration being necessarily complete, it results therefrom that a number of different magnetic head systems are utilized in magnetic tape storages, depending on application and design.

All of these possible embodiments of magnetic layer storages thus share a number of fundamental boundary conditions. The development tendency in all magnetic layer storages is still in the direction toward increasing the storage capacity, given simultaneously improved dependability, i.e. a reduced error rate when writing and/or reading. The storage capacity in the track direction can be increased by increasing the flux changes per length unit. The increased bit density, however, leads to a reduced read signal amplitude, to signal interferences due to shifts of peak values, and thus to a higher risk that a recording pulse will be suppressed. Even with improved storage media and storage heads, therefore, the bit density cannot be arbitrarily increased. The other possibility of enhancing the storage capacity is to increase the track density. However, it thus becomes more and more difficult to read the information tracks that become narrower and narrower or, in more general terms, to exactly position the magnetic head to a selected information track.

In view of this trend, the significance of tolerances in the mechanical structure of a magnetic head system itself, as well as the mounting to a magnetic head carrier, increases, as does the overall positioning means which positions the magnetic head system with respect to the information tracks of the storage medium. This is again valid in the same way both for different magnetic head systems as well as for different positioning devices, even though the individual tolerances that can be designed in with reasonable expense may differ from case to case.

U.S. Pat. No. 4,679,104, incorporated herein by reference, already discloses that the effect of these tolerances can definitely differ, even given individual units of magnetic head systems of the same type, and that it is therefore necessary to individually acquire these effects in order to be able to precisely position. The above publication discloses a method and an arrangement for positioning a magnetic head to various tracks of a magnetic tape, whereby control signals for a motor-driven displacement of the positioner unit are generated by comparing respective actual position values of the magnetic head to rated position values that are allocated to the various tracks of the magnetic tape. These control signals are generated for a motor controller of the positioner means in the normal operation of the magnetic tape storage by use of stored position values. These position values are identified during a measuring event wherein the magnetic head system is moved from a defined reference position and is positioned to the middle of at least one track, and wherein this position is allocated to a defined, measured position value. According to the known, technical teaching, these position values can be composed of nominal values that are valid for a plurality of magnetic tape recording means of the same type, and are composed of individual correction values that are individually calculated for every magnetic tape recorder means. The basic idea on which this known solution is based is to input defined, respectively individually measured values into the controller of each and every individual magnetic tape recorder means, on the basis whereof the means is in the position to take individual tolerances in the respective magnetic tape recorder means into consideration in every positioning event, i.e. to compensate them.

This known method definitely satisfies demands, given today's commercially available magnetic tape recorder cassette devices having approximately up to 30 parallel information tracks on the magnetic tape. The problem, however, is that the correction values measured therewith are themselves still relatively imprecise because the measurement for calibrating the individual tape drive is itself still affected by errors. This is critical in storage devices having an interchangeable storage medium, for example magnetic tape recorder cassette devices. According to the known method, the individual tolerances of the positioner means vis-a-vis such a magnetic tape and cassette unit is acquired in a commercially available design. During normal operation, however, the cassettes described in this fashion can be introduced into different tape drives. If, given retention of the known calibration method, one would like to further increase the storage capacity in such devices, one would nonetheless have to keep these tolerances low—despite the desired tolerance compensation—with an expense that could not be justified for cost reasons in order to guarantee full compatibility.

SUMMARY OF THE INVENTION

It is an object of the invention to improve the known method for positioning the magnetic head relative to the storage medium such that the increasing demands in view of a tolerance compensation are also satisfied. The invention is also based on the object of creating an apparatus with which such an improved method can be implemented.

According to a method of the invention, to create calibration data to compensate for device-associated tolerances, a reference storage medium is employed which has a precisely defined track pattern in the form of at least one reference track recorded thereon under defined conditions. Actual positions of a specific magnetic head being calibrated are determined when the head is positioned with reference to the reference track. Such actual position data is compared to absolute position data so as to create calibration correction information. This correction information is then stored and later applied to nominal position signals output by control electronics when positioning the specific magnetic head which has been calibrated.

This solution is based on the consideration that several embodiments of positioner systems are currently available whose resolution with respect to the required positioning breath or scope is extremely high, as viewed in terms of the drive. In and of itself, thus positioning could currently be carried out with great precision and with an expense which is justifiable in terms of manufacture. The problem, however, is that the entire structure of each of the known positioning devices is relatively complicated. This is true both of inductively driven oscillatory coils in rotary positioners as well as of pot-core coil drives or stepping motor drives in linear positioners. In every case, the positioner means is formed of a number of discrete parts respectively affected by tolerances, so that concatenations or linking together of tolerances result during assembly and the possibilities of the high resolution of the drive can therefore no longer be converted with full utilization. For cost reasons, one cannot justify making more and more stringent demands of the individual tolerances because of the unavoidable concatenations of tolerances. This is true both of the magnetic head itself as well as of the positioner means in and of itself, and finally of the assembled unit as well.

A certain, concatenated tolerance should therefore be considered as a given, and further possibilities should be sought to individually compensate such tolerances in the tape drive. Under such conditions, the individual tolerance concatena must be identified when calibrating the individual tape drive in and of itself, and must be identified with particular care. A critical feature of the solution of the invention is in utilizing a reference which is normal for this calibration, i.e. a storage medium whose properties, and particularly whose dimensions, are known with absolute precision insofar as possible. With an expense that is still justifiable, it is also possible with known means—for example given exactly defined laboratory conditions such as ambient temperature, atmospheric humidity, a precise balancing of the electronics of a tape drive, etc. —to record track patterns on a selected storage medium, the properties of these track patterns, particularly relative positions as well, being exactly known within the framework of obtainable measuring precision.

When the test run for the device-associated calibration of a tape drive is then carried out by use of a reference medium produced in such a way, then all deviations of the absolute position of the magnetic head from a device-associated normal position, i.e. a normal position prescribed by the design which are identified, are based only on the tolerance concatena of the individual tape drive. Correction values that are dependent only on these tolerances can thus be calculated in a device-associated way. Full compatibility between individual tape drives within an apparatus type can thus be obtained, even given an interchangeable storage medium.

What is thus fundamentally established as the trend is to place a certain "intelligence" into the individual tape drive which makes it possible for the tape drive to itself correct its own errors in a framework prescribed by the scope of the correction values that are provided. The expense in the tape drive required for this purpose remains within extremely narrow boundaries in comparison to the obtainable advantages. In any case, controllers for positioners must be in the position to compare actual positions of the magnetic head to a rated position, in order to be able to carry out a positioning event. For that purpose, such controllers are often already equipped at present with a microprocessor as well as with corresponding memory devices. The microprocessor or some other, suitably constructed controller must therefore merely be equipped such that the desired correction values can be calculated from the relationship of the measured nominal positions of the magnetic head to the absolute positions prescribed by the track pattern of the reference storage medium, and can be stored in a non-volatile way.

These correction values are then available during normal operation in order to convert momentary nominal position values into corrected position values with the respectively corresponding correction factor. The controller of the positioner means is thus in a position at any time to position the magnetic head with absolute precision. For example, this allows information tracks on the storage medium to be kept extremely narrow and to thereby even potentially abandon unrecorded bands between neighboring tracks without an exact track allocation of the magnetic head being thereby lost.

What is more critical in the solution is the manufacture of the reference storage medium, particularly producing the desired track pattern. In accordance with a development of the invention, an apparatus for the implementation of the discussed method is employed for this purpose whose critical component part is a type-associated tape drive, together with the corresponding positioner means. It is recommended to select this tape drive in view of low concatenated tolerances of the positioner means. A positioner means that is manufactured with special care, and specifically for such a reference device, could even be employed. This, however, does not seem absolutely necessary. The type-associated magnetic head employed for this purpose is also critical, this being likewise selected in view of its individual tolerances, or is separately manufactured for this use. All in all, the equipment of the reference device thus does not differ from a type-associated tape drive in this respect.

Over and above this, however, there is a need for devices coupled to the magnetic head or to the carrier thereof with which—as a reference position—preferably a tape edge of the reference storage medium can be exactly calculated with reference to the nominal position of the magnetic head. Moreover, a position detector that is equipped in a known way, for example as a mechanical or optical detector, must be provided, the respective, absolute position of the magnetic-head relative to the storage medium being identifiable therewith. One is then in the position to thus produce track patterns prescribed under defined conditions with exact reproducibility at any time.

DESCRIPTION OF THE PREFERRED EMBODIMENTS

Figure 1:
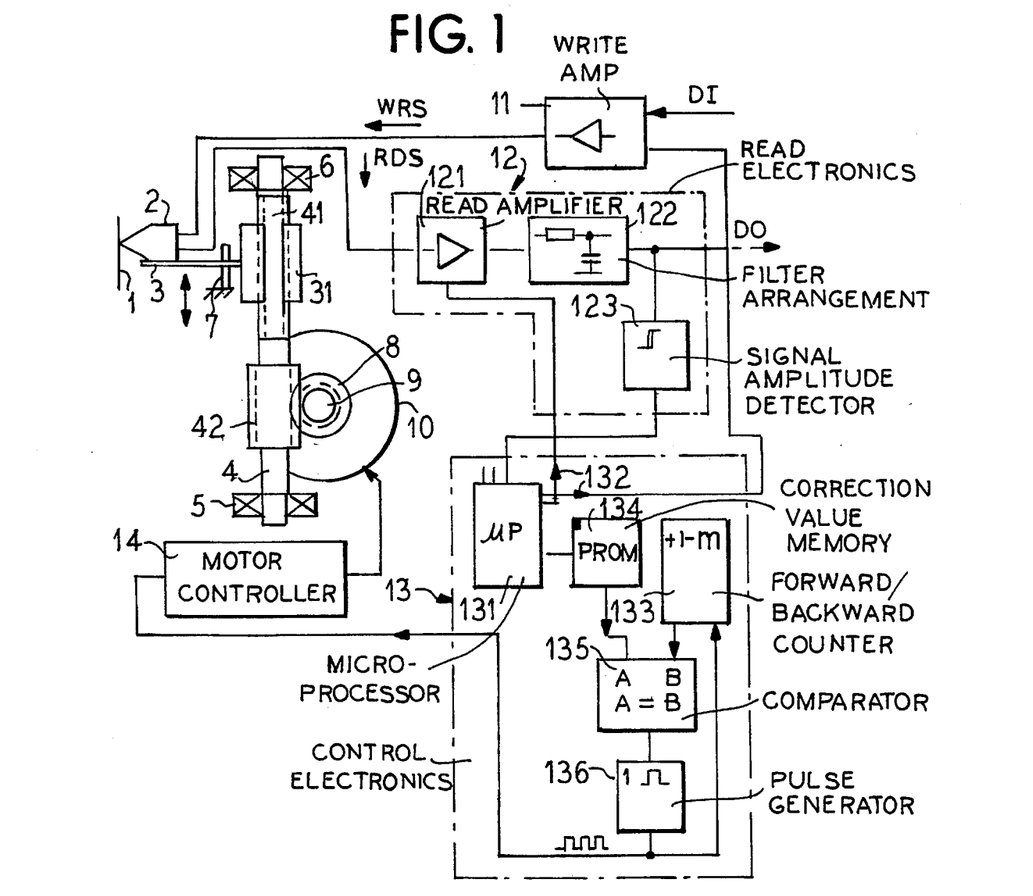
FIG. 1 illustrates a schematic structure of a positioner means for a magnetic tape recorder device and the corresponding read or control electronics.

FIG. 1 schematically shows parts of a tape drive for a magnetic tape recorder cassette device to an extent that seems expedient in the given context. A magnetic tape 1 is schematically shown in section, this being conveyed perpendicular to the plane of the drawing by a magnetic tape drive (not shown). A magnetic head 2 that is designed as a write/read head resides opposite the magnetic tape 1. The structure of this magnetic head 2 is not restricted to a specific embodiment; on the contrary, any of the known structures of magnetic heads for magnetic tape recorder cassette devices can be employed.

In the simplest case, the magnetic head 2 can comprise only a single magnetic gap that is then both the read as well as the write gap. Given more involved embodiments, the magnetic head 2, however, could also have a plurality of magnetic gaps, from which the possibility of designing individual read or write heads results. Here, too, different arrangements are known which, for example, enable the operating functions of "read" and "write" with individual magnetic head systems, potentially in both conveying directions of the magnetic tape 1. Magnetic heads are also known which—during an ongoing recording event with a write head—immediately allow a monitor reading of data just recorded with a read head following in the conveying direction. Whereas magnetic heads whose write or read gaps are aligned exactly perpendicular to the conveying direction of the magnetic tape 1 are usually currently employed for recording digital data on a magnetic tape recorder cassette device, it would also be conceivable here to employ a magnetic head 2 whose magnetic gaps are arranged at prescribed azimuthal angles transversely relative to the conveying direction of the magnetic tape 1. Different azimuthal angles then permit an increase in the track density on the magnetic tape 1 without signal interferences from neighboring tracks being thereby produced.

Figure 2:
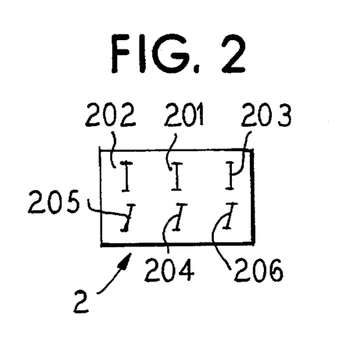
FIG. 2 shows a schematic structure of a magnetic head useful in a tape drive of FIG. 1.
Figure 6A:
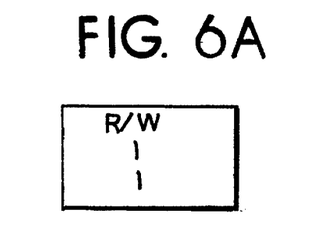
FIGS. 6A, 6B, and 6C show three alternatives to the magnetic head structure shown in FIG. 2.
Figure 6B:
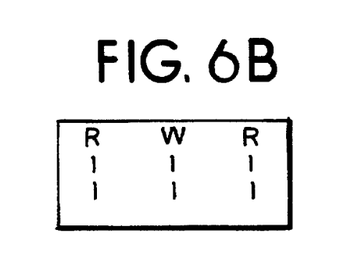
Figure 6C:
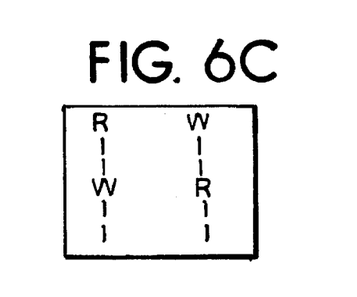

FIG. 2 schematically shows an example of the structure of a magnetic head 2 which is selected from the number of possible formats of magnetic heads (additional formats are shown in FIGS. 6A–6C). FIG. 2 shows the surface facing toward the magnetic tape 1 in a magnetic head 2 which comprises two magnetic head systems lying under one another, i.e. arranged transversely relative to the conveying direction of the magnetic tape 1. These magnetic head systems are respectively represented by corresponding magnetic gaps 201, 202, 203 or 204, 205, 206, whereby the magnetic gaps of the two magnetic head systems each have a respectively different azimuthal angle. Given the magnetic head systems each respectively formed of three magnetic gaps in the selected example, let the magnetic gaps 201 or 204 lying in the middle respectively represent the magnetic gaps for two write heads. The magnetic gaps, for example 202 or 203 lying to the left or right thereof, are then magnetic gaps of a respective read head.

Each magnetic head system of this arrangement permits an immediate monitoring reading during a recording event of the information just recorded, this being permitted in both conveying directions of the magnetic tape 1. Over and above this, the two-channel structure of the magnetic head 2, i.e. the arrangement of two magnetic head systems lying under one another whose magnetic gaps have different azimuthal angles, permits a data recording on the magnetic tape 1 with what are likewise the corresponding, different azimuthal angles in recording tracks of the magnetic tape 1 that lie side-by-side.

Figure 3:
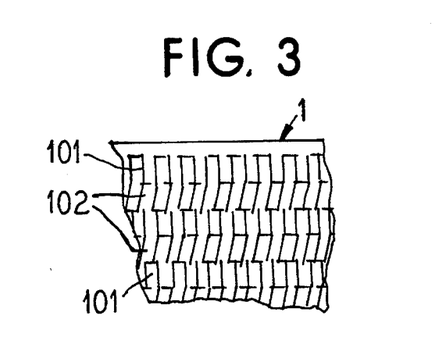
FIG. 3 is a portion of a magnetic tape on which information tracks are recorded with a magnetic head of FIG. 2.

FIG. 3 schematically shows a magnetization pattern produced in this way on a portion of the magnetic tape 1. Recording tracks 101 or 102 having a different track type lie side-by-side in alternating fashion parallel to the longitudinal axis of the magnetic tape 1. The information tracks 101 of the first track type show magnetization changes aligned perpendicular to the longitudinal axis of the magnetic tape 1 that are schematically shown as strokes. These information tracks 101 are recorded with the write head 201 of the first magnetic head system. The information tracks 102 of the other track type lie between these information tracks 101 of the one track type, the magnetization changes in this other track type being recorded by the write head 204 of the second magnetic head system. Consequently, they are aligned obliquely relative to the transverse axis of the magnetic tape 1 with the prescribed azimuthal angle. Let it be re-emphasized that such a recording method with the assistance of the magnetic head structure shown in FIG. 2 represents merely one of many possibilities for digital data recording in magnetic tape recorder cassette devices. The example set forth with reference to FIGS. 2 or 3 was selected, among other reasons, because it is already relatively complicated for the purpose of recording digital data on a magnetic tape and thus illustrates that the employment of such magnetic head structures has also been envisioned in the present case, whereby the technical teaching yet to be set forth is not limited thereto.

As derives without further ado from the above explanation of FIG. 3, the magnetic head 2 must be positionable transversely relative to the longitudinal axis of the magnetic tape 1 for recording the various tracks 101 or 102. For this purpose, traditional magnetic tape recorder cassette devices have a positioner means. Only by way of example, let the positioner means disclosed by U.S. Pat. No. 4,679,104 be incorporated by reference in this context. Such a positioner means is therefore merely schematically shown in FIG. 1.

Figure 7:
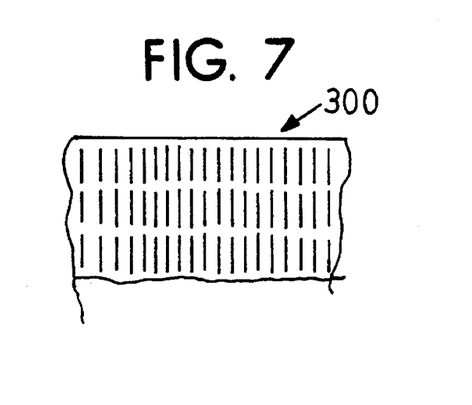
FIG. 7 illustrates an alternative track layout to that shown in FIG. 3.

FIG. 7 shows a track layout which is an alternative to that shown in FIG. 3. In FIG. 7 the tracks are recorded with no azimuth angle and with a guard band (clean area) between the tracks.

FIG. 1 shows that the magnetic head 2 is fixed on a carrier arm 3 that, as indicated by a double arrow, is in turn displaceable transversely relative to the longitudinal axis of the magnetic tape 1 with the assistance of a gear arrangement.

This gear arrangement provides a positioning spindle 4 arranged parallel to the transverse axis of the magnetic tape 1 that is rotatably seated at both ends in bearings 5 or 6. In the region under the upper spindle bearing 6, the positioning spindle 4 comprises a thread that is preferably designed as a worm thread 41. A threaded sleeve 31 is slipped onto this thread, the carrier arm 3 being laterally hinged to this threaded sleeve 31. A guide element 7 for the carrier arm 3 is schematically indicated, this preventing a lateral swing of the carrier arm 3 in the operating condition. When the positioning spindle 4 is now placed into rotational motion, then the threaded sleeve 31 together with the carrier arm 3 migrates in an upward or downward direction because of the rotary limitations of the guide element 7 dependent on the rotational sense of the positioning spindle, whereby the relative position of the magnetic head 2 vis-a-vis the magnetic tape 1 changes.

In order to produce this rotary motion of the positioning spindle 4, a worm wheel 42 having an outside thread is fixed thereon in the lower part. A worm 8 engages into this outside thread, this worm being arranged on the shaft 9 of a motor 10. This motor 10 can be designed as a DC motor, but is preferably designed as a stepping motor. The rotatory step motion of the drive motor 10 effects the lifting or lowering motion of the carrier arm 3 with the assistance of the described gear arrangement dependent on the rotational sense thereof. The described structure of the positioning means was selected for this example for reasons of clarity. It is thus definitely not the only or even only a preferred embodiment of such a positioner means. It is merely intended to illustrate that positioner means for magnetic heads or magnetic head systems of magnetic tape recorder cassette devices are relatively complicated in mechanical terms because of the necessary conversion of a rotational motion of a drive element into a linear lifting or lowering motion, and that several mechanical elements thereby collaborate, all of these being affected by tolerances. Consequently, all such positioner means cannot be manufactured adequately in tolerance-free manner without further ado, even given high manufacturing expense and an expedient structural design.

To an extent considered expedient in the present case, the electronics of the tape drive of a magnetic tape recorder cassette device is also schematically shown in FIG. 1. A write electronics in the form of a write amplifier 11 to which data DI to be recorded are supplied, and which supplies these to the magnetic head 2 as amplified write signals WRS, is indicated. The data recording event as well as the recording method play only a subordinate part in the present case, so that it in fact does not seem necessary to show the write electronics in greater detail in FIG. 1, or to explain it in greater detail. The corresponding electronic circuits of known magnetic tape recorder cassette devices can be referenced for this purpose.

During a read event, the magnetization patterns on the magnetic tape 1 induce analog read signals RDS in the magnetic head 2, these being supplied to a read electronics 12 of the magnetic tape recorder cassette device. Such read electronics are also intrinsically known, so that, by way of simplification, only a read amplifier 121 is connected to a filter arrangement 122 that reshapes the amplified read signals and limits them. A signal line shown in the form of a broken line is indicated at the output of this filter arrangement. It is also shown that the read signals RDS are further edited in the read electronics 12, and finally are output as digitized read data DO.

The only thing that is also of significance in the present case is that a unit is provided which evaluates the signals output by the filter arrangement 122. As shown, this evaluation unit could be a Schmitt trigger, i.e. a signal amplitude detector 123. It would also be conceivable without further ado to construct this evaluation unit as an analog-to-digital converter. In the case of an amplitude detector that has been assumed for the sake of simplicity, this outputs a signal having a positive signal edge at its output as soon as the amplitude of the read signal output by the filter arrangement 122 exceeds a prescribed threshold. This pulse condition is maintained until the signal amplitude at the input of the amplitude detector 123 again falls below this threshold. The output signals of the amplitude detector 123 are thus square-wave pulses. For reasons that are yet to be set forth, these are supplied to a control electronics 13 of the tape drive of the magnetic tape recorder cassette device. During normal operation, this control electronics serves the purpose of setting the magnetic head 2 to a selected track of the magnetic tape 1. Such control electronics of tape drives for magnetic tape recorder cassette devices are known and, for example, are also disclosed in the afore-mentioned U.S. Pat. No. 4,679,104, incorporated herein by reference. FIG. 1 therefore shows such a control electronics 13 only in simplified form, and is excerpted in view of the details of the present application.

A microprocessor 131 is shown as a central control means which monitors the operating functions of "read" or "write" and, as schematically indicated, is therefore connected via control lines 132 both to the write electronics 11 and to the read electronics 12. Given a track change of the magnetic head 2, the microprocessor 131 indicates the new rated position. The current actual position of the magnetic head 2 is continuously stored in a memory that is designed as a forward/backward counter 133 in the present exemplary embodiment.

The output signals of the microprocessor 131 which correspond to a rated position value of the magnetic head 2 are used to address a correction value memory 134 that is preferably designed as a programmable read-only memory. This correction value memory contains correction values individually assigned to a tape drive, and which outputs the rated information output by the microprocessor 131 regarding a selected track number in the form of corrected values for the selected rated position, i.e. values corresponding to the individual tape drive.

A comparator 135 is connected to the outputs of the counter 133 or of the correction value memory 134. This comparator 134 calculates the distance of the magnetic head 2 from the selected track, both in terms of amount as well as in terms of direction, from the difference between the rated position and the momentary actual position.

The comparator 135 drives a pulse generator 136 with its output signals. In response thereto, this pulse generator 136 outputs pulses to a motor controller 14 allocated to the drive motor 10 until the selected rated position coincides with the momentary actual position. At the same time, the counter reading of the forward/backward counter 133 is constantly updated by the output signals of the pulse generator 136.

In the present instance, it was then assumed that developments in magnetic tape recorder cassette devices are aimed at expanding the storage capacity by increasing the track density on the storage medium, the magnetic tape 1 here. Among other things, this can only be achieved with improved magnetic heads that have narrow tolerances in physical terms and with improved positioning devices. The expense for manufacturing magnetic heads and for the devices that position these relative to the magnetic tape 1 thus arises. Competition in the market place, however, forces the manufacturer to optimize the manufacturing costs of his products, i.e. increased storage capacity given at least unaltered product quality, cannot be achieved via increased manufacturing costs. The latitude of the tolerances of the finished products, i.e. of the magnetic heads but also of the entire positioner means, can certainly be reduced with improved manufacturing methods, but not to the extent that would be required. Relatively high tolerances in the structure of magnetic heads themselves as well as in the structure of the positioner means are thus givens, and must nonetheless be controlled.

A way out of this dilemma is to presume that such individual deviations from a predetermined norm are givens, but to exactly identify their influences on the positioning procedure in device-associated form. The controller of the tape drive of a magnetic tape recorder cassette device is informed of the device-associated offset of the magnetic head 2 from a nominal position, so that the controller of the positioner means can itself compensate the device-associated error in every positioning event.

This concept is not limited to a defined structure of the magnetic head 2, nor to a defined recording method nor even to a defined design concept for the positioner means itself. What must be assumed, however, is that the positioner means for the magnetic head 2 has a high resolution with reference to the width of the magnetic tape, i.e. is movable over the width of the magnetic tape 1 with a number of steps having a small step width. The positioner means must thereby be designed such that its controller, and particularly the control electronics 3, always "knows" where the magnetic head 2 should be nominally located. This can be realized either in that a detector for the momentary actual position of the magnetic head 2 vis-a-vis the magnetic tape 1 is provided, or that the positioner means can be directly controlled. As set forth above, this can be realized in many instances since a stepping motor that forms the drive motor 10 for the positioner means is supplied with stepping pulses which are in turn counted. Apart from this, the specific design of the positioner means plays only a subordinate part.

Further, a detector means is required in every case, this being in the position to read and evaluate stored information on the magnetic tape 1. An example of such a read electronics was set forth above with reference to FIG. 1.

Finally, an electronic controller is required that is in position to store a specific information about an actual position of the magnetic head, to re-employ this stored information for a precisely executed control in the positioning events during normal operating conditions, and to thereby compensate the device-associated errors. The control electronics 13 set forth above with reference to FIG. 1 also permits this.

Under these conditions that every tape drive of a magnetic tape recorder cassette device must meet, a reference magnetic tape can be utilized on which predetermined tracks are recorded with high precision in order to identify the device-associated tolerances of the individual tape drive, as shall yet be set forth in detail.

First, let us present how such a reference magnetic tape is produced. Obviously, a specifically equipped tape drive is required for this purpose. This first affects the magnetic head 2 itself. The magnetic head 2 could be a standard head provided for the respective application which then, however, would have to be specifically selected for this use in view of low tolerances. It may also often prove beneficial to utilize a magnetic head specifically manufactured for this purpose. Although this is relatively involved and costly as well, such an expense is justifiable given a single magnetic head, but not in the corresponding standard heads in mass production. For example, it would even be conceivable to manufacture this recording head for the reference magnetic tape, potentially for a plurality of reference magnetic tapes, and with a different technology, for example as a thin-film magnetic head. Thin-film technology has definitely been mastered, but is complicated in comparison to the manufacturing technology for ferrite heads and is thus costly. The above explanations show that a person skilled in the art has possibilities available for manufacturing a magnetic head that is definitely suitable for producing a reference magnetic tape.

Such a head must then be carefully mounted on a positioner means, for example the type set forth with reference to FIG. 1. This is possible without further ado under laboratory conditions, and is also possible with traditional means, even though with a corresponding expense. What is here also meant by laboratory conditions is that corresponding parameters such as, potentially, atmospheric humidity and ambient temperature, are identified and continue to be observed during the calibration of the tape drive.

Figure 4:
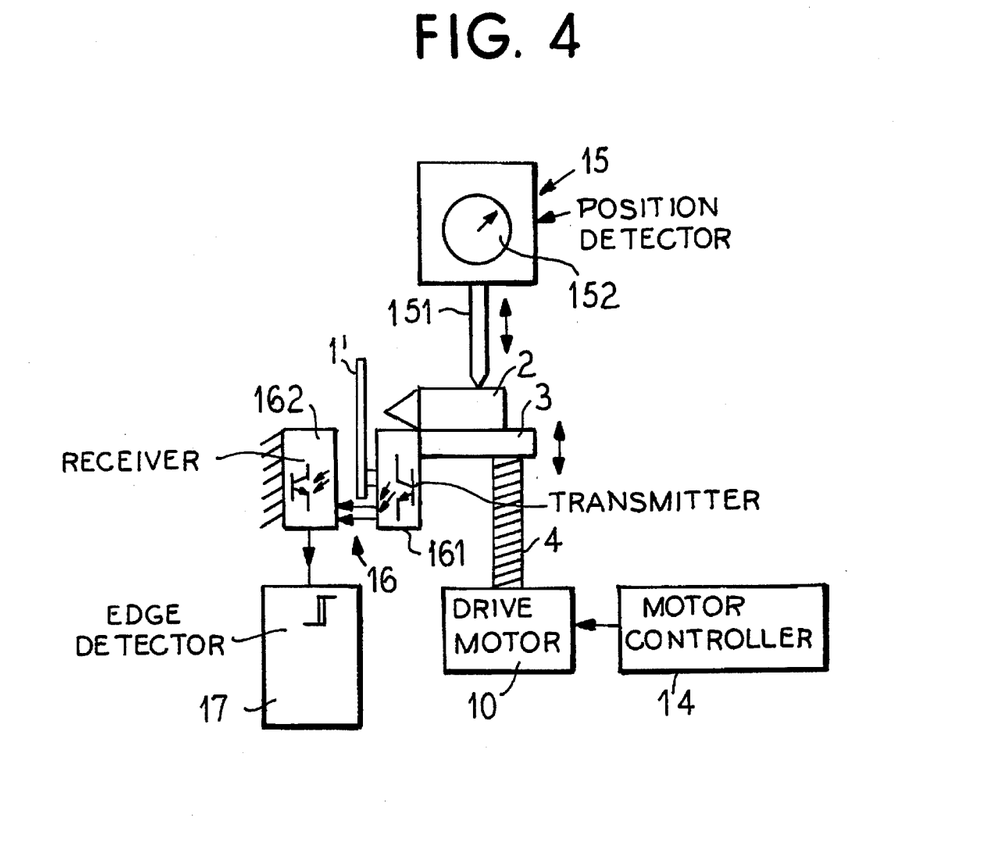
FIG. 4 illustrates a schematic structure of a positioner means for producing a reference magnetic tape.

An arrangement according to FIG. 4 is employed for the calibration of the tape drive for manufacturing a reference magnetic tape. In view of the preceding position of the positioner means with reference to FIG. 1, the only things schematically shown here in FIG. 4 are the magnetic head 2 mounted on the carrier arm 3, as well as the positioning spindle 4 together with the corresponding drive 10. The absolute position of the magnetic head 2 must be continuously calculated in the calibration of the tape drive dependent on the nominal position respectively prescribed by the drive 10, 14 of the positioner means.

A measuring instrument with which the absolute position of the magnetic head 2 can be identified is necessary for this purpose. This is schematically indicated in FIG. 4 by a position detector 15 that comprises a sensor 151 attaching at the magnetic head 2, and also comprises a display means 152 in order to display the respective absolute position of the magnetic head. Numerous possibilities are available to a person skilled in the art for designing such measuring instruments for identifying an absolute position, these enabling such a measurement in a purely mechanical way, with optical or inductive means, so that a more detailed explanation thereof is certainly not required here.

The calibration is based on a reference position of the magnetic head 2, this preferably being an edge of the reference magnetic tape 1' in a cassette inserted into the tape drive. Possibilities for recognizing a tape edge of the magnetic tape are known in detail to a person skilled in the art, for example from U.S. Pat. No. 4,476,503 or U.S. Pat. No. 4,639,796, both incorporated herein by reference.

FIG. 4 therefore merely schematically indicates a light barrier 16. A transmitter 161 of this light barrier 16 is secured to the carrier arm 3, whereas the corresponding receiver 162 of the light barrier is stationarily arranged. An output signal of the receiver 162 is supplied to an edge detector 17 which evaluates the output signal of the light barrier 16 and thus determines when the magnetic head 2 assumes the reference position. Proceeding from this reference position, the magnetic head 2 can then be moved via the positioner means into any arbitrary, relative position with respect to the magnetic tape 1', whereby the positional precision is dependent only on the step width of the drive of the positioner means as well as on the measuring precision of the selected position detector 15.

On the basis of the results of the calibration procedure, information tracks in any desired position can be recorded in a traditional way on the reference magnetic tape 1 in the usual way. A tape material that is especially selected for its quality is preferably employed as the reference magnetic tape. Under certain conditions, it is also expedient to employ reference magnetic tapes in combination with specifically manufactured magnetic tape recorder cassettes which thus observe optimally strict tolerances. However, this does not seem to be absolutely necessary in every case since, as stated above, one can proceed from a tape edge of the reference magnetic tape 1' which defines the reference position.

A great variety of track patterns can be recorded on the reference magnetic tape 1 in order to then use these for individually calibrating the individual tape drives of a mass-produced series. In the simplest case, a single information track suffices for this purpose, this being recorded with the described arrangement, preferably in the middle of the tape, in a defined relative position with respect to the reference edge of the reference magnetic tape 1'.

Figure 5:
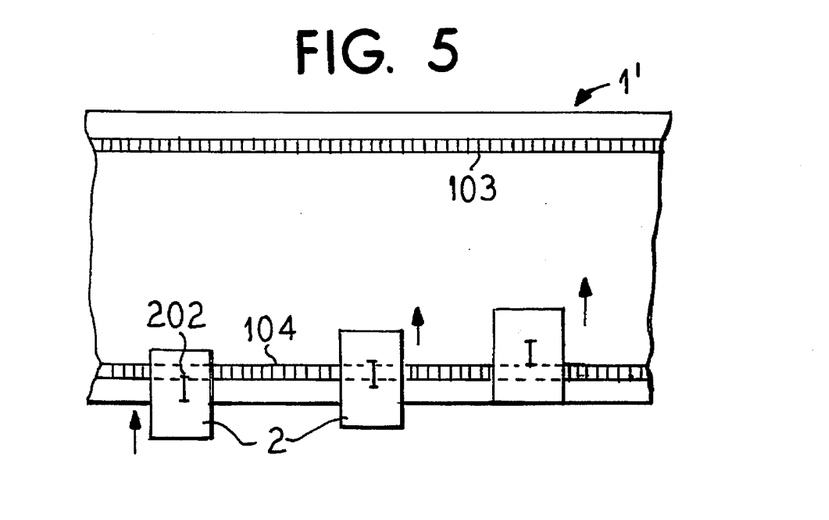
FIG. 5 is an example of a track pattern that is recorded on a reference magnetic tape as well as various positions of the magnetic head relative to this magnetic tape during the course of a device-associated calibration procedure.

As schematically shown in FIG. 5, two information tracks 103 and 104 can also be expediently recorded on the reference magnetic tape 1', these tracks to be preferably respectively arranged close to one of the two tape edges in order to obtain an optimally great distance of these two information tracks from one another, and thus to enhance the precision of the calibration procedure of the individual tape drives. It is thus assumed that the distance between the centers of the tracks of the two reference tracks 103 and 104 is defined as exactly as possible by the recording event. From the above-described calibration procedure for the manufacture of reference tapes, given, for example, a stepping motor control, how many steps are nominally required in order to move the magnetic head 2 from one position above the track middle of the one reference track, for example 103, to position it over the track center of the other reference track 104, are also already known.

Under these conditions, the calibration procedure can be individually implemented for the mass-produced tape drives. A described reference magnetic tape 1' is introduced into the tape drive to be tested, and in the test run, the center of the track of the lower reference track is first identified with the assistance of the read signals RDS output by the magnetic head 2. As schematically shown in FIG. 5, the magnetic head 2—proceeding from a position under the reference track 104—is slowly moved across this track in an upward direction. As set forth with reference to FIG. 1, the track edges are identified in the control electronics 13 during this procedure, dependent on the number of steps of the positioner means required for this purpose. The analogous case applies to the evaluation of the upper reference track 103. In particular, the actual number of steps between the two track centers of the reference tracks 103 and 104 should thereby also continue to be identified by the microprocessor 131 of the control electronics 13.

Let this be set forth with reference to an example, whereby it is assumed that the magnetic head 2 resides in a position under the lower reference track 104. When the magnetic head 2 is then moved in an upward direction transversely relative to the longitudinal direction of the reference magnetic tape 1', the lower track edge of the reference track 104 is identified in a defined position with the assistance of the amplitude detector 123. Let this position be defined here as a zero position. The magnetic head 2 is then moved farther in an upward direction until the upper track edge is identified via the amplitude detector 123; let this be the case, for example, after 52 steps. On the basis of a simple formation of the difference, the control electronics 13 derives therefrom that the track center of the lower reference track 104 lies in position 26.

Given a further excursion of the magnetic head 2 in the direction toward the upper reference track 103, the individual steps are continuously counted. For example, let the amplitude detector 123 reach the lower track edge of the upper reference track 103 at a numerical value of 620. The magnetic head 2 is moved farther in the direction of the upper tape edge of the reference magnetic tape 1' and identifies the upper track edge of the reference track 123 at, for example, a positional value of 674. In an analogous way, the track center of the upper reference track 103 can be calculated as having the positional value 647 based on the difference between the positional values 674 and 620. Further, the control electronics 13 or the microprocessor 131 thereof can calculate the distance between the two track centers of the reference tracks 103 and 104 from the difference between the positional values for the track centers of the reference tracks. In the assumed example, this distance amounts to 621 positioning steps.

Let it now be assumed that the nominal, expected number of positioning steps between the two track centers according to the specification of the tape drive under test is 600. A correction factor k that has the value 1.035 in the example can then be calculated from the ratio of the number of steps 621 actually identified relative to the specified number of steps 600. This is thus a device-associated correction value that is stored in the control electronics 13 of this tape drive under test and that is always used during normal operation for correcting all positioning events. It is, of course, self-evident that the value stated by way of example for the correction factor k need not always necessarily be greater than 1. Frequently, positioner devices exhibit a certain hysteresis; it can therefore be meaningful to also calculate correction values on the basis of a movement of the magnetic head from top to bottom as well as, when warranted, to form an average of the two directionally dependent correction factors.

The track pattern shown with reference to FIG. 5 represents only one of several possibilities, so that the employment is not limited thereto. As already mentioned, only a single track could also be utilized for calculating the correction factor k; this, however, would then preferably be an extremely wide track, whereby the two track edges, in particular, are then identified and evaluated in a corresponding way. If a plurality of reference tracks are to be recorded on the reference magnetic tape 1' for other reasons, then such a track pattern could also be utilized for calculating the correction factor k insofar as the control electronics 13 of the corresponding tape drive is placed in the position of identifying which of the reference tracks traversed are to be utilized for the exact calculation of the correction factor k.

The above description refers to the calculation of an individual correction factor k which covers tolerances of the positioner means, i.e., of the drive and, in particular, of the multiplier gearing as well. Further correction factors could also be fundamentally identified and permanently stored in the control electronics 13 of the respectively tested tape drive. As an example of the structure of a magnetic head 2, an embodiment having two magnetic head systems was shown in FIG. 2. In an analogous evaluation, a correction factor for the actual deviation of the distance of two or more such magnetic head systems from one another could also be calculated. In this case, the individual magnetic head systems are respectively positioned—as set forth above—with respect to the center of the track of a defined reference track, for example that of the lower reference track 103 according to FIG. 5. The actual spacing of the individual magnetic head systems from one another is identified in this way. Such a further correction factor, which derives from the ratio of the measured spacing to the specified spacing, can likewise be stored in the control electronics 13 in order to then be always utilized during normal operation when a switch is made from the use of one magnetic head system to another.

Further measurements can be undertaken during the calibration of the individual tape drive in order to obtain other information about tolerances of the respective magnetic heads. For example, the magnetic head systems of the magnetic head structure shown in FIG. 2 comprise two read heads with a write head centrally arranged therebetween. When the magnetic head is not quite exactly adjusted, or when it has tolerances in the arrangement of the heads within a magnetic head system, then the described measurements can also be used to identify the actual gap centers of both read heads. Theoretically, the two center positions should be identical regardless of which read head is used when reading information. When, however, a difference is found, this is proof of a deviation of the track centers. Such a correction value can then always be used whenever previously recorded data are re-read with the corresponding read head.

The temperature as one of the parameters has already been often mentioned above. It is expedient to undertake the production of the reference magnetic tape 1' and the calibration of the tape drives at preferably the same temperature. Over and above this, however, it could be meaningful given a greater temperature response of the respective tape drive head to register individual correction values k for individual temperature ranges. Then, however, a temperature sensor would have to be provided in the tape drives so that the controller 13 can select the suitable correction factors. The analogous case would also be potentially conceivable for taking the atmospheric humidity into consideration.

The exemplary embodiment set forth above wherein the positioning errors of a tape drive of a magnetic tape cassette recorder device that are to be attributed to manufacturing tolerances are reduced and optimally compensated, represents only one example of a possible use. The invention, however, is definitely not limited to this example. It would also be fundamentally conceivable to employ this correction method not only generally in magnetic tape recorder devices for audio and video recording, but, given a corresponding adaptation, for the apparatus-associated calibration of tape drives for floppy disk stores and even for hard-disk storages. The described exemplary embodiment also shows that the use of this method of the invention is definitely not limited to specific types of positioner devices. Instead of the described stepping mechanism, for example, it would also be conceivable to utilize other known positioner devices such as linear positioners having a current-controlled moving coil arrangement, or even rotary positioners having an oscillatory coil drive.

It was also shown that the use of the invention is not limited to specific magnetic head structures, but that this method for identifying and compensating manufacturing tolerances can also be adapted in a flexible way to the respectively existing application. The only thing that is critical in all of these applications is that a track pattern is produced in an exactly defined way with an optimally exactly calibrated tape drive on the storage medium serving as a reference, whether magnetic tape or magnetic disc, so that this reference carrier can then be employed as a calibration standard for the device-associated calibration. It is also assumed that the respective tape drive controller has means that are in the position to read, to interpret the information recorded on the calibration normal, and thus to identify the device-associated deviations. Finally, the correction values calculated in this way must be capable of being stored in non-volatile fashion in the tape drive controller so that these correction values are available at any time during ongoing operations as long as the positioner means of the tape drive, potentially only the magnetic head as well, is not replaced. After such maintenance work, however, a renewed calibration of the individual tape drive would be necessary.

Although various minor changes and modifications might be proposed by those skilled in the art, it will be understood that I wish to include within the claims of the patent warranted hereon all such changes and modifications as reasonably come within my contribution to the art.

I claim as my invention:

1. An apparatus for positioning a specific write/read head to tracks on a specific magnetic storage medium by use of a specific head positioner which moves the head and steps across the storage medium, comprising:

a reference magnetic storage medium having a precisely defined and positioned reference track pattern thereon;

means for determining for said reference storage medium a number of nominal steps required for a nominal head positioner to move a nominal write/read head from a first track pattern reference point to a second track pattern reference point on said reference track pattern;

means for positioning the reference magnetic storage medium adjacent the specific head positioner and specific write/read head;

means for moving the specific write/read head from said first reference track pattern point to said second reference track pattern point and means for counting the number of actual steps required by the specific head positioner;

means for comparing the number of actual steps to the number of nominal steps and creating a correction factor based on the comparison;

means for storing the correction factor; and means for utilizing the stored correction factor when positioning the specific write/read head with the specific head positioner to tracks on the specific magnetic storage medium.

2. A method for positioning a specific write/read head to tracks on a specific magnetic storage medium by use of a specific head positioner which moves the head in steps across the storage medium, comprising the steps of:

providing a reference magnetic storage medium having precisely defined and positioned first and second spaced reference tracks thereon;

determining for said reference storage medium a number of nominal steps required for a nominal head positioner to move a nominal write/read head from a center of the first reference track to a center of the second reference track;

placing the reference magnetic storage medium adjacent the specific head positioner means and specific write/read head;

moving the specific write/read head from the center of the first reference track to the center of the second reference track and counting the number of actual steps required by the specific head positioner;

comparing the number of actual steps to the number of nominal steps and creating a correction factor based on the comparison;

storing the correction factor; and utilizing the stored correction factor when positioning the specific write/read head with the specific head positioner to tracks on the specific magnetic storage medium.

3. A method according to claim 2, including the steps of determining the centers of the first and second reference tracks by first detecting upper and lower track edges of these tracks, and using these edges to find the centers.

4. A method for positioning a specific write/read head to tracks on a specific magnetic storage medium by use of a specific head positioner which moves the head in steps across the storage medium, comprising the steps of:

providing a reference magnetic storage medium having a precisely defined and positioned relatively wide reference track thereon;

determining for said reference storage medium a number of nominal steps required for a nominal head positioner to move a nominal write/read head from a lower edge of the wide reference track to an upper edge of the wide reference track;

placing the reference magnetic storage medium adjacent the specific head positioner and specific write/read head;

moving the specific write/read head from the lower edge of the wide reference track to the upper edge of the wide reference track and counting the number of actual steps required by the specific head positioner;

comparing the number of actual steps to the number of nominal steps and creating a correction factor based on the comparison;

storing the correction factor; and utilizing the stored correction factor when positioning the specific write/read head with the specific head positioner to tracks on the specific magnetic storage medium.

5. A method for positioning a specific write/read head to tracks on a specific magnetic storage medium by use of a specific head positioner which moves the head and steps across the storage medium, comprising the steps of:

providing a reference magnetic storage medium having a precisely defined and positioned reference track pattern thereon;

determining for said reference storage medium a number of nominal steps required for a nominal head positioner to move a nominal write/read head from a first track pattern reference point to a second track pattern reference point on said reference track pattern;

placing the reference magnetic storage medium adjacent the specific head positioner and specific write/read head;

moving the specific write/read head from said first reference track pattern point to said second reference track pattern point and counting the number of actual steps required by the specific head positioner;

comparing the number of actual steps to the number of nominal steps and creating a correction factor based on the comparison;

storing the correction factor; and utilizing the stored correction factor when positioning the specific write/read head with the specific head positioner to tracks on the specific magnetic storage medium.

6. A method according to claim 5 including the further steps of:

providing said specific head with a first write/read channel and a second write/read channel;

moving the specific write/read head first write/read channel from the first reference track pattern reference point to the second reference track pattern reference point and counting the number of actual steps required as a first count;

moving the specific write/read head second write/read channel from said first reference track pattern reference point to said second reference track pattern reference point and counting the number of actual steps required as a second count;

comparing the first actual step count to the second actual step count and creating a further correction factor based on said comparison, said correction factor being indicative of a deviation from nominal of the spacing between the first and second write/read channels on the specific head;

storing the further correction factor; and utilizing both the correction factor and said further correction factor when positioning the specific write/read head channels with the specific head positioner means to tracks on the specific magnetic storage medium.

* * * * *